June 5, 1928.  
G. C. SCHMIDT ET AL  
1,672,042  
COMBINATION TANK VENT, FLAME ARRESTER AND SNUFFER  
Filed Aug. 21, 1926  2 Sheets-Sheet 1

INVENTORS  
George C. Schmidt,  
Frank G. D. Muller  
BY Hardway Cathey  
ATTORNEYS June 5, 1928.

G. C. SCHMIDT ET AL 1,672,042

COMBINATION TANK VENT, FLAME ARRESTER AND SNUFFER

Filed Aug. 21, 1926   2 Sheets-Sheet 2

INVENTORS
George C. Schmidt
Frank G. D. Mueller.
BY
Hardway & Cathey
ATTORNEYS.

Patented June 5, 1928.

1,672,042

UNITED STATES PATENT OFFICE.

GEORGE C. SCHMIDT AND FRANK G. D. MULLER, OF HOUSTON, TEXAS, ASSIGNORS TO THE STAYTITE COMPANY, OF HOUSTON, TEXAS, A CORPORATION OF TEXAS.

COMBINATION TANK VENT, FLAME ARRESTER AND SNUFFER.

Application filed August 21, 1926. Serial No. 130,580.

This invention relates to new and useful improvements in a combination tank vent, flame arrester and snuffer.

One object of this invention is to provide an apparatus of the character described specially designed for use in connection with vapor tight tanks, or reservoirs containing evaporative fluids such as crude petroleum or its derivatives and whereby the pressure of vapors generated in the tank, or a partial vacuum within the tank caused by condensation, or contraction of vapor within the tank or by the withdrawal of liquid therefrom may be relieved.

Another object of the invention is to produce an apparatus of the character described so constructed as to prevent communication of fire to the vapors or fluid within the tanks from the burning vapor on the outside of the tank, in case of ignition of the latter by lightning, or otherwise, and the apparatus also embodies a manually operable snuffer through which the flame, on the outside of the tank, in case of such ignition, may be snuffed out, said snuffer at the same time permitting the outlet of vapor from the tank and inlet of air into the same so as to maintain the pressure within the tank within certain limits to prevent the bursting, or collapsing of the tank.

A further feature of the invention is to produce an apparatus of the character described of such design that, in case of high winds, the pressure in the tank will not be increased thereby.

With the above and other objects in view the invention has particular relation to certain novel features of construction, operation and arrangement of parts, an example of which is given in this specification and illustrated in the accompanying drawings, wherein:—

Figure 1:
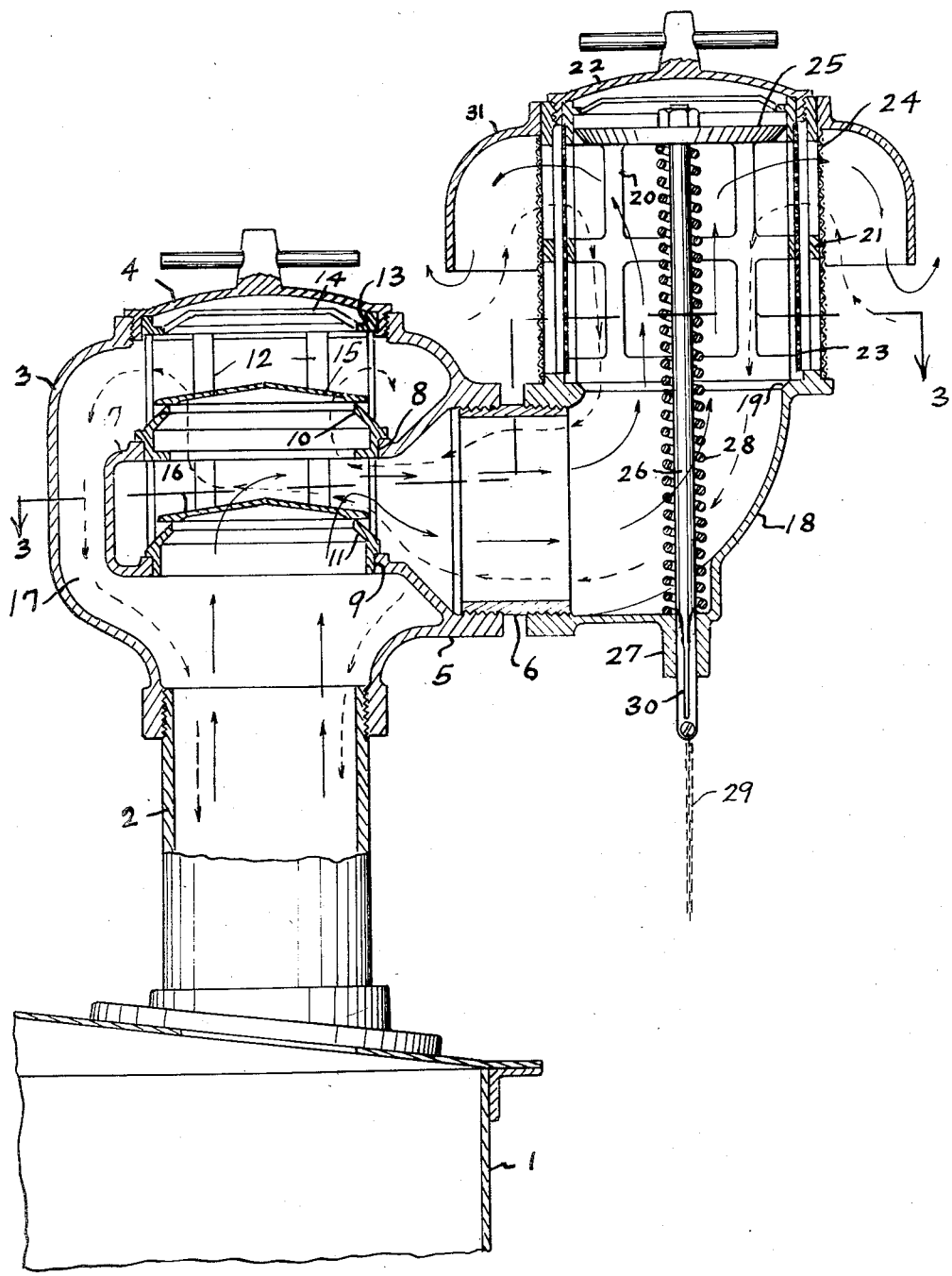
Figure 1 shows a vertical sectional view of the apparatus applied to the tank.
Figure 2:
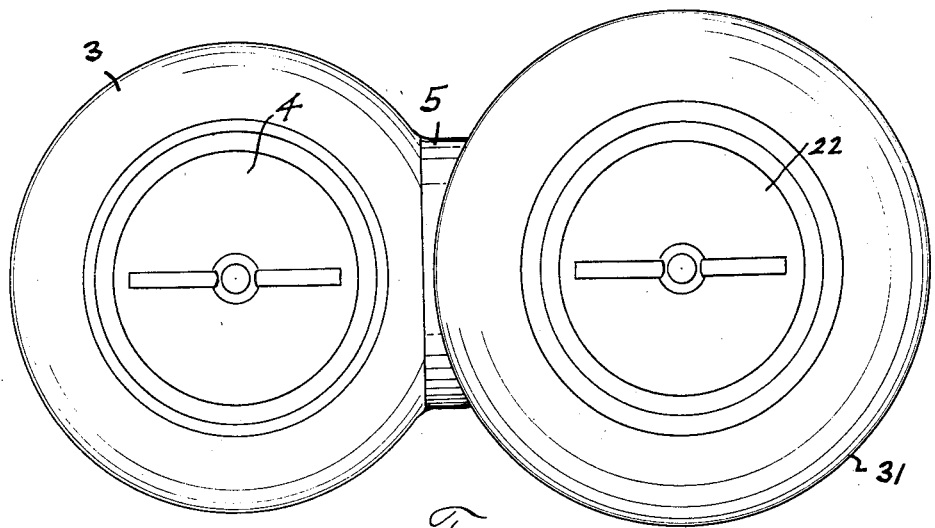
Figure 2 shows a plan view thereof.
Figure 3:
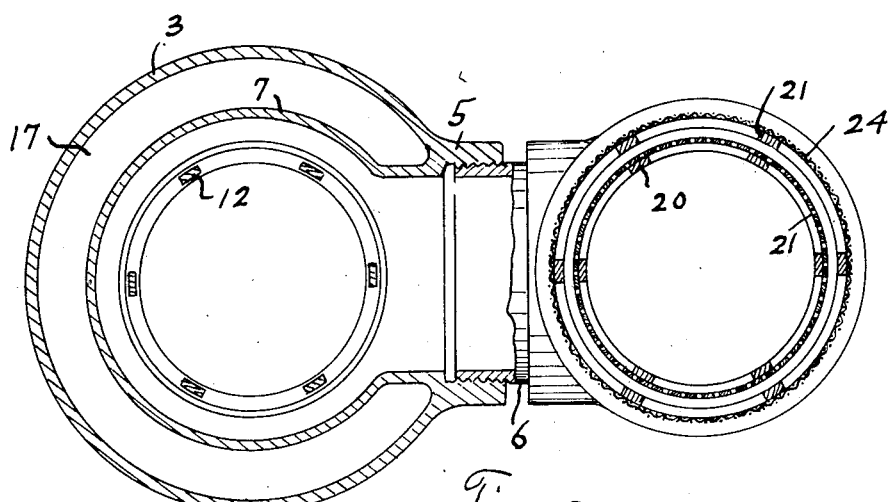
Figure 3 shows a cross sectional view taken on the line 3—3 of Figure 1.

Referring now more particularly to the drawings, wherein like numerals of reference designate similar parts in each of the figures, the numeral 1 designates a tank or reservoir which, except as hereinafter stated, is fluid tight. This may be a crude oil tank or reservoir for containing any other evaporative fluid. The apparatus, it is understood, may be used in connection with any type of tank or reservoir where it is desired to maintain a substantially equal pressure within and without the tank, or to prevent the bursting of the tank from excessive pressure within it, or the collapsing thereof by reason of the outside air pressure, in case of a vacuum within the tank, or where it is desired, to safely permit the escape of inflammable vapors from the tank.

The numeral 2 designates a vent tube which leads up from the top or upper part thereof.

Fastened to the outer end of this vent tube there is a valve casing 3, whose upper end is normally closed by the removable screw plug 4. Formed integrally with one side of the case there is a tubular neck 5 into which a tubular nipple 6 is screwed and integral with said neck there is an inwardly extending shell 7 of semi-circular contour in plan view. The top and bottom of this shell have the concentric circular openings 8 and 9 to receive the annular, valve seats 10 and 11. These seats are anchored in fixed relation by vertical bars 12 which are spaced apart and whose upper end are attached to a ring 13 fitted within and against which the cap 4 abuts when screwed into place. The ring 13 has the cross bar 14 forming a hand grip so that when the plug 4 is removed the ring 13 and seats 10 and 11 may be removed as a unit. For this purpose the opening 8 is of a diameter large enough to permit the passage through it of the seat 11. When these parts are removed access to the interior of the tank 1 is permitted for measuring the fluid therein, or other desired purpose.

Seated on the respective seats 10 and 11 are the disc-like valves 15 and 16 which are fixed against lateral displacement by bars 12 which form cages for said valves. The shell 7 is spaced from the walls of the casing 3 forming an air inlet 17 for the vent tube 2.

Screwed to the outer end of the nipple 6 there is an elbow 18 having its free end preferably upturned and formed with a valve seat 19 and anchored to said free end of the elbow 18 and surrounding said seat and spaced apart are the inside and outside open work cages 20 and 21 and screwed into the upper end of the cage 21 and surrounding and abutting against the upper end of the cage 20 there is a screw cap 22. Surrounding the cage 20 there is a fine mesh screen 23 of any suitable foraminated material which acts as a flame arrester in case the vapor on the outside becomes ignited by lightning or otherwise and thus prevents communication of the fire to the inside of the tank and surrounding the outer cage 21 there is a coarse mesh screen 24 which protects the inner screen against mechanical injury and prevents the collection of foreign material around said inner screen 23. Within the cage 20 there is a valve 25 which is secured to the upper end of the valve rod 26 and this rod works through a bearing 27 at the bottom of the elbow 18. Surrounding the rod 20 there is a coil spring 28 which rests on the bottom of the elbow 18 and supports the valve 25, normally in open position.

In case vapor on the outside of the apparatus becomes ignited the valve 25 may be seated against the seat 19 by an additional pull on the chain 29, attached to the lower end of the rod 26, and the flame thus snuffed out. When the flame is extinguished the chain 29 may be released and the spring 28 will then open the valve 25. The lower end of the rod 26 is provided with a number of vertical grooves 30 providing outlet passages for any fluid that may condense and collect within the apparatus.

A surrounding hood 31 is fastened to the upper end of the outer cage 21 and surrounds and is spaced from the upper end of the screens so as to protect them from the elements and for the further purpose of radiating heat from the said screens in case vapors on the outside become ignited.

With a tank wholly or partly filled with petroleum vaporization of same will gradually create pressure in the tank until the pressure is sufficient to lift the valve 16 from time to time to permit escape of vapor. The pressure required to lift said valve will depend on the weight of the valve. The vapor thus escaping will then pass out to free air through the neck 5, the nipple 6, elbow 18 and the screens. In case the petroleum is drawn off from the tank, or in case of condensation or contraction of vapors therein a partial vaccum will be created in the tank and the outside air pressure will lift the valve 15 and admit air into the tank through the passageway 17.

The screens 23 and 24 are disposed out of line with the nipple 6 so that in case of a high wind the wind will pass through said screens but will not enter the tank to increase the pressure therein. In case the pressure in the tank should be increased by high wind it might cause the bursting of the tank.

In case the gas escaping should become ignited outside of the tank, as by lightning, the flame will be arrested by the screen 23, as explained and will not be communicated to the gas or oil within the tank and the flame may be snuffed out by closing the valve 25, as explained to prevent any substantial injury to the apparatus.

What we claim is:

1. An apparatus of the character described having a laterally disposed passageway whose outlet end is turned at an angle to said passageway and provided with a valve seat, a cylindrical screen around said seat, a valve within the screen, means normally holding the valve in open position, means for manually seating the valve to close said outlet.

2. An apparatus of the character described having a laterally disposed passageway whose outlet end is turned at an angle to said passageway and provided with a valve seat, a cylindrical screen around said seat, a valve within the screen, means normally holding the valve in open position, means for seating the valve to close said outlet, and a hood attached to and surrounding and spaced from the outer end of said screen.

3. An apparatus of the character described formed with a passageway provided with valve seats, one above the other, valves controlling said seats and adapted one to be opened by fluid pressure exerted one way through the passageway and the other to be opened by fluid pressure exerted the other way through said passageway, a casing inclosing said valves, a cylindrical screen surrounding the outlet end of said passageway and extending above said casing.

4. An apparatus of the character described formed with a passageway provided with valve seats, one above the other, valves controlling said seats and adapted one to be opened by fluid pressure exerted one way through the passageway and the other to be opened by fluid pressure exerted the other way through said passageway, a cylindrical screen surrounding the outlet end of said passageway, a valve for controlling said outlet end, means normally holding said last named valve open and manual means for closing said valve.

5. An apparatus of the character described formed with a passageway provided with valve seats, valves controlling said seats and adapted one to be opened by fluid pressure exerted one way through said passageway and the other to be opened by fluid pressure exerted the other way through said passageway, the outlet end of said passageway being upturned and formed with a valve seat, a snuffer valve for controlling said outlet seat, means normally holding the snuffer valve open, manual means connected to the snuffer valve and through which it may be seated.

6. An apparatus of the character described formed with a passageway provided with valve seats, valves controlling said seats and adapted one to be opened by fluid pressure exerted one way through said passageway and the other to be opened by fluid pressure exerted the other way through said passageway, the outlet end of said passageway being upturned and formed with a valve seat, a snuffer valve for controlling said outlet seat, means normally holding the snuffer valve open, manual means connected to the snuffer valve and through which it may be seated and a screen surrounding said snuffer valve and its seat.

7. An apparatus of the character described formed with a passageway provided with valve seats, valves controlling said seats and adapted one to be opened by fluid pressure exerted one way through said passageway and the other to be opened by fluid pressure exerted the other way through said passageway the outlet end of said passage being upturned and formed with a valve seat, a snuffer valve for controlling said outlet seat, means normally holding the snuffer valve open, a manual means connected to the snuffer valve and through which it may be seated and a plurality of screens spaced apart and surrounding said snuffer valve and seat.

8. An apparatus of the character described formed with a laterally disposed passageway whose outer end is upturned and formed with an outlet valve seat, a screen around said seat and disposed above said passageway, a manually operable valve for closing said seat and means normally holding said valve in open position.

9. An apparatus of the character described formed with a laterally disposed passageway whose outer end is upturned and formed with an outlet valve seat, a screen around said seat and disposed above said passageway, a manually operable valve for closing said seat, and means normally holding said valve in open position, valve seats within said passageway, valves controlling said last named seats and adapted one to be opened by fluid pressure exerted one way through said passageway and the other by fluid pressure exerted the other way through said passageway.

In testimony whereof we have signed our names.

GEORGE C. SCHMIDT.
FRANK G. D. MULLER.